US012784316B1

(12) United States Patent
Chen et al.

(10) Patent No.: US 12,784,316 B1

(45) Date of Patent: Nov. 3, 2026

(54) SPEECH DRIVEN ANIMATION

(71) Applicant: Zoom Communications, Inc., San Jose, CA (US)

(72) Inventors: Yuhui Chen, San Jose, CA (US); Gengdai Liu, Singapore (SG)

(73) Assignee: Zoom Communications, Inc., San Jose, CA (US)

( * ) Notice: Subject to any disclaimer, the term of this patent is extended or adjusted under 35 U.S.C. 154(b) by 132 days.

(21) Appl. No.: 18/322,899

(22) Filed: May 24, 2023

Related U.S. Application Data

(63) Continuation of application No. 17/893,083, filed on Aug. 22, 2022, now abandoned.

(51) Int. Cl.

| | |
|---|---|
| ***G06T 13/20*** | (2011.01) |
| ***G06T 13/40*** | (2011.01) |
| ***G10L 15/02*** | (2006.01) |
| ***G10L 21/10*** | (2013.01) |

(52) U.S. Cl.

CPC ............ *G06T 13/205* (2013.01); *G06T 13/40* (2013.01); *G10L 15/02* (2013.01); *G10L 21/10* (2013.01); *G10L 2015/025* (2013.01); *G10L 2021/105* (2013.01)

(58) Field of Classification Search

CPC ....... G06T 13/205; G06T 13/40; G10L 15/02; G10L 21/10; G10L 2015/025; G10L 2021/105

See application file for complete search history.

(56) References Cited

U.S. PATENT DOCUMENTS

| | | | | |
|---|---|---|---|---|
| 10,360,716 | B1 * | 7/2019 | van der Meulen | G10L 25/57 |
| 11,113,859 | B1 * | 9/2021 | Xiao | G06T 15/005 |
| 2008/0259085 | A1 * | 10/2008 | Chen | G06T 13/40 345/473 |
| 2011/0273455 | A1 * | 11/2011 | Powar | G11B 27/10 345/473 |
| 2018/0336716 | A1 * | 11/2018 | Ramprashad | G06V 20/20 |
| 2019/0197755 | A1 * | 6/2019 | Vats | G06T 13/40 |
| 2020/0166670 | A1 * | 5/2020 | Zass | G06V 20/40 |
| 2021/0142818 | A1 * | 5/2021 | Edwards | G10L 21/10 |
| 2022/0044463 | A1 * | 2/2022 | Kang | G06T 13/205 |
| 2023/0021339 | A1 * | 1/2023 | Bosnak | G06T 13/40 |

* cited by examiner

*Primary Examiner* — Xiao M Wu
*Assistant Examiner* — George Renze

(57) ABSTRACT

Various embodiments of an apparatus, method(s), system(s) and computer program product(s) described herein are directed to a Vocal Action Engine. The Vocal Action Engine receives audio data (i.e. input audio data) associated with a user account. The Vocal Action Engine predicts at least one occurrence of a type of a vocal action in the audio data from a plurality of varying types of the same vocal action. The Vocal Action Engine determines a talking speed based on the audio data. The Vocal Action Engine renders the predicted type of vocal action portrayed according to the talking speed via a face model.

20 Claims, 9 Drawing Sheets

410

$$S_i = K * \frac{D_0}{Ds_i} * S_0$$

$$Ds_i = (1 - \lambda) * Ds_{i-1} + \lambda * D_i$$

FIG. 4B

SPEECH DRIVEN ANIMATION

CROSS-REFERENCE TO RELATED APPLICATION(S)

This application is a continuation of U.S. patent application Ser. No. 17/893,083, filed Aug. 22, 2022, the entire disclosure of which is hereby incorporated by reference.

FIELD

Various embodiments relate generally to digital communication, and more particularly, to online video and audio.

SUMMARY

The appended Abstract may serve as a summary of this application.

BRIEF DESCRIPTION OF THE DRAWINGS

The present disclosure will become better understood from the detailed description and the drawings, wherein:

FIGS. 4A and 4B are each a diagram illustrating an exemplary environment in which some embodiments may operate.

DETAILED DESCRIPTION

Figure 1A:
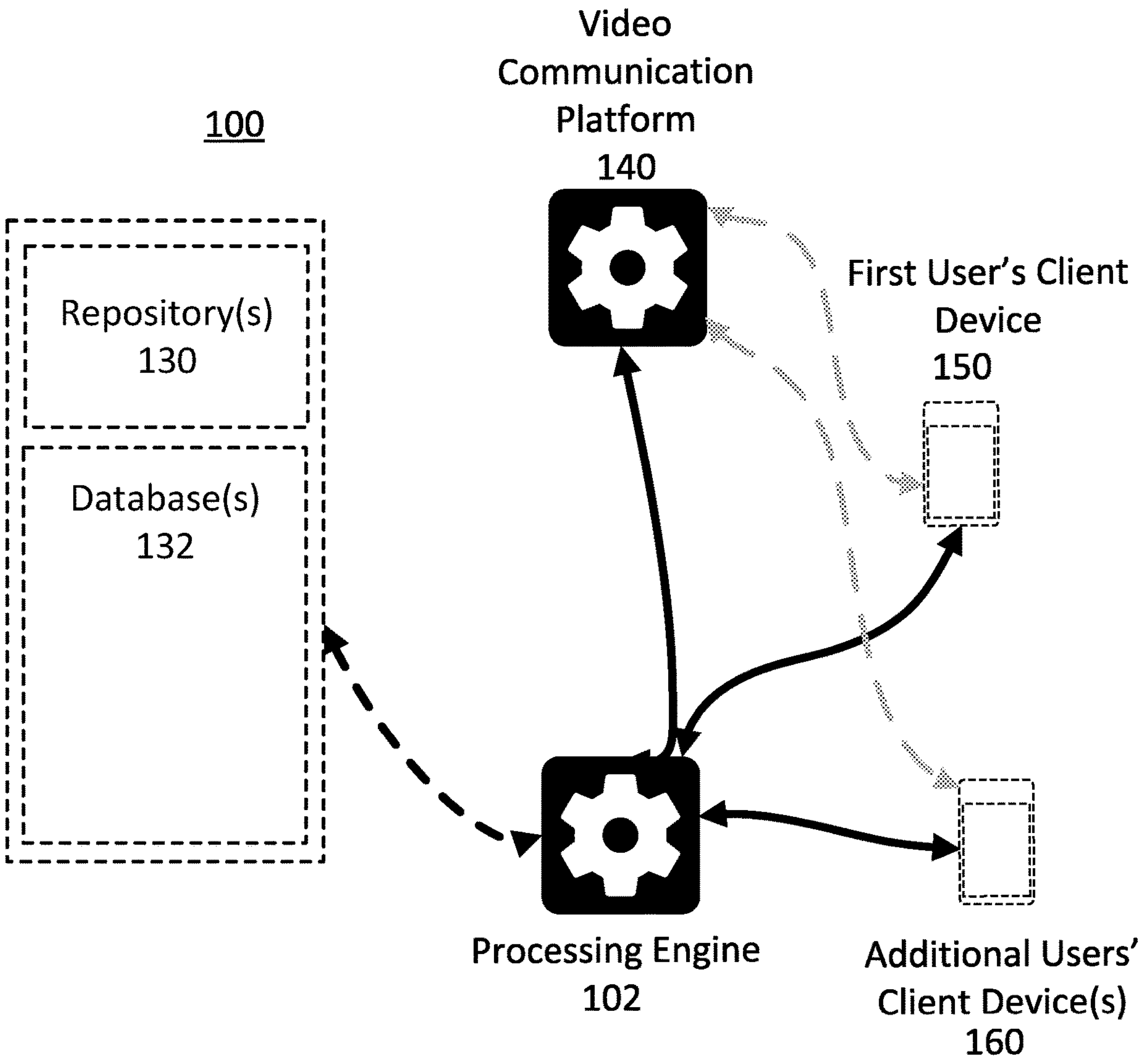
FIG. 1A is a diagram illustrating an exemplary environment in which some embodiments may operate.

Various embodiments of a Vocal Action Engine are described herein that provide functionality for identifying and rendering facial and/or body language actions via a digital embodiment based on various attributes of input audio data. In particular, various embodiments of the Vocal Action Engine provide for generation of animated facial movements (and/or body movements) for a digital embodiment that represents a user account based on audio data associated with the voice data of a user account. The user account may correspond to a participant in a virtual online conference. However, the user account may opt out of providing video data. That is, the user account may not be providing video data for a video feed showing the live, physical appearance of an individual accessing the virtual online conference via the user account. For example, the voice data may be voice data generated during the virtual meeting by the user account.

The user account may elect for a digital embodiment to be presented in the virtual online conference in place of video presenting the individual's live, physical appearance. However, actual audio data for the user account is generated based on the individual speaking. The audio data is captured and transmitted to the virtual online conference. This feature may require authorization of an account administrator prior to use.

In some embodiments, the Vocal Action Engine detects one or more laughter sounds occurring in the audio data feed of the user account represented by the digital embodiment. The one or more laughter sounds may be, for example, a different types of laughter sounds. The Vocal Action Engine further determines a talking speed of the user account's audio data feed. The Vocal Action Engine identifies a predefined laughter visual effect that corresponds with the type of laughter sound detected in the user account's audio data feed. The Vocal Action Engine modifies a pre-set talking speed for that detected type of laughter sound according to the current talking speed of the user account's audio data feed.

The Vocal Action Engine applies the predefined laughter visual effect according to the modified talking speed to a face model used for rendering the digital embodiment. By modifying the laughter visual effect's pre-set talking speed according to the talking speed detected in the input audio data, the Vocal Action Engine generates a more realistic rendering of the laughter visual effect by the digital embodiment since the digital embodiment will visually convey performance of animated facial movements for the detected type of laughter sound in close synchronization with the audio of the detected type of laughter sound.

According to various embodiments, the Vocal Action Engine receives audio data (i.e. input audio data) associated with a user account. The Vocal Action Engine predicts at least one occurrence of a type of a vocal action in the audio data from a plurality of varying types of the vocal action. The Vocal Action Engine determines a talking speed based on the audio data. The Vocal Action Engine renders the predicted type of vocal action portrayed according to the talking speed via a face model.

According to various embodiments, the Vocal Action Engine determines the current talking speed for the rendering of the predicted type of vocal action according to one or more changes in the audio data. The Vocal Action Engine continually receives a sequence of viseme identifiers. Each viseme identifier corresponds with one or several instances of a sound present in the audio data. The Vocal Action Engine continually analyzes the sequence of viseme identifiers. The Vocal Action Engine identifies durations of time between when changes in viseme identifiers occur. That is, the Vocal Action Engine identifies durations of time between differing viseme identifiers positioned in the sequence. The Vocal Action Engine determines the talking speed based at least in part one or more of the identified durations of time. It is understood that the Vocal Action Engine continually updates the talking speed as it receives additional new portion of the sequence of viseme identifiers.

It is further understood that a face model is not limited to defining a facial body region to be rendered. Rather, the face model may also define additional body parts such as, for example, a neck, shoulders, arms, hands, torso, waist, legs and/or feet. Modification of a laughter visual effect by the Vocal Action Engine may therefore include rendering of the laughter visual effect such that performance of the detected type of laughter is also visually conveyed by animated movements of the additional body parts.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data. One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 500,600 (of FIGS. 5, 6) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
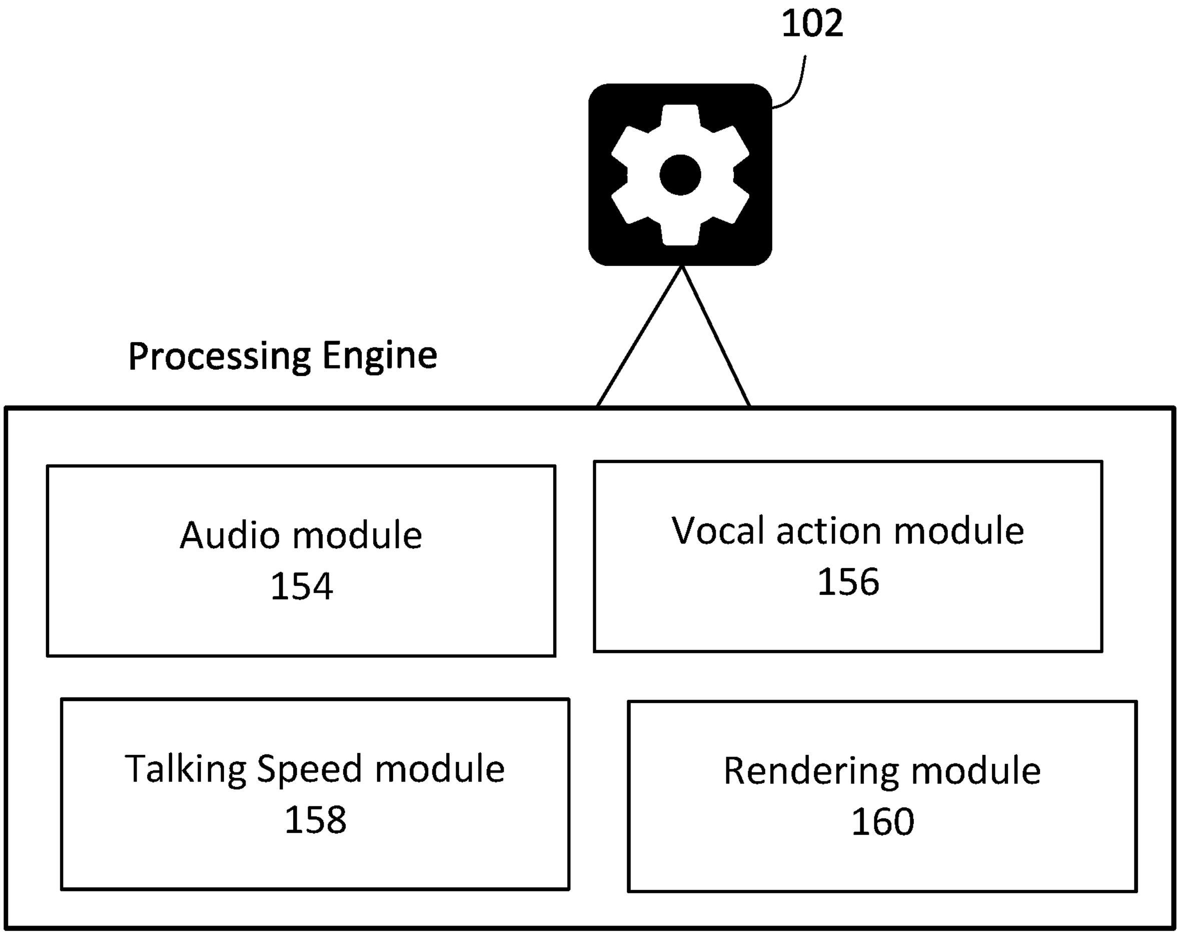
FIG. 1B is a diagram illustrating an exemplary environment in which some embodiments may operate.

FIG. 1B is a diagram illustrating exemplary software modules 154, 156, 158, 160 of a Vocal Action Engine that may execute at least some of the functionality described herein. According to some embodiments, one or more of exemplary software modules 154, 156, 158, 160 may be part of the processing engine 102. In some embodiments, one or more of the exemplary software modules 154, 156, 158, 160 may be distributed throughout the communication platform 140.

The audio module 154 functions to receive one or more portions of audio data.

The vocal action module 156 functions to predict at least one occurrence of a type of a vocal action in the audio data from a plurality of varying types of the same vocal action.

The talking speed module 158 functions to determine a talking speed based on the audio data.

The rendering module 160 functions to render the predicted type of vocal action portrayed according to the talking speed via a face model.

The above modules 154, 156, 158, 160 and their functions will be described in further detail in relation to FIGS. 3, 4A, 4B, 5 and 6.

Figure 2:
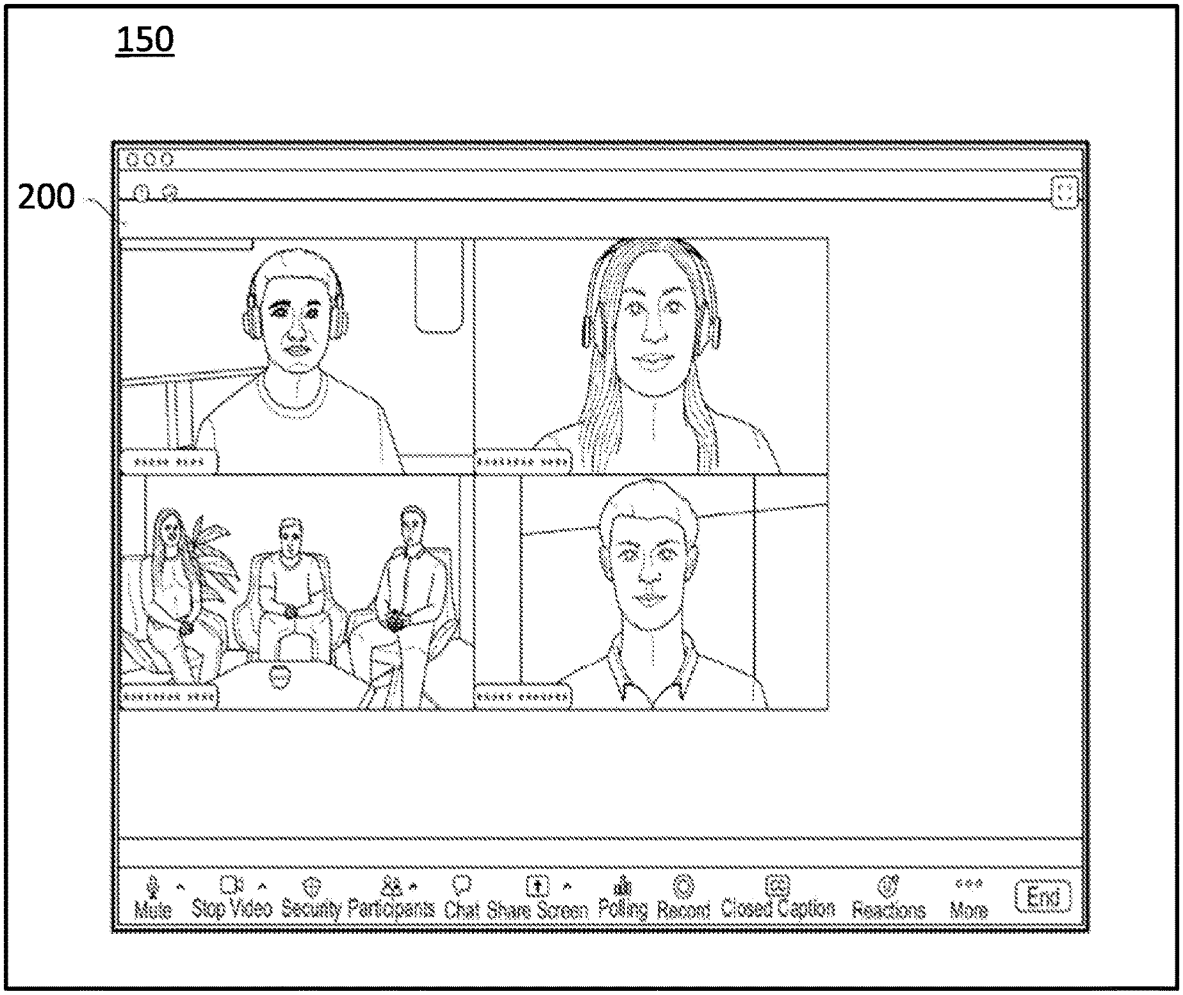
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3:
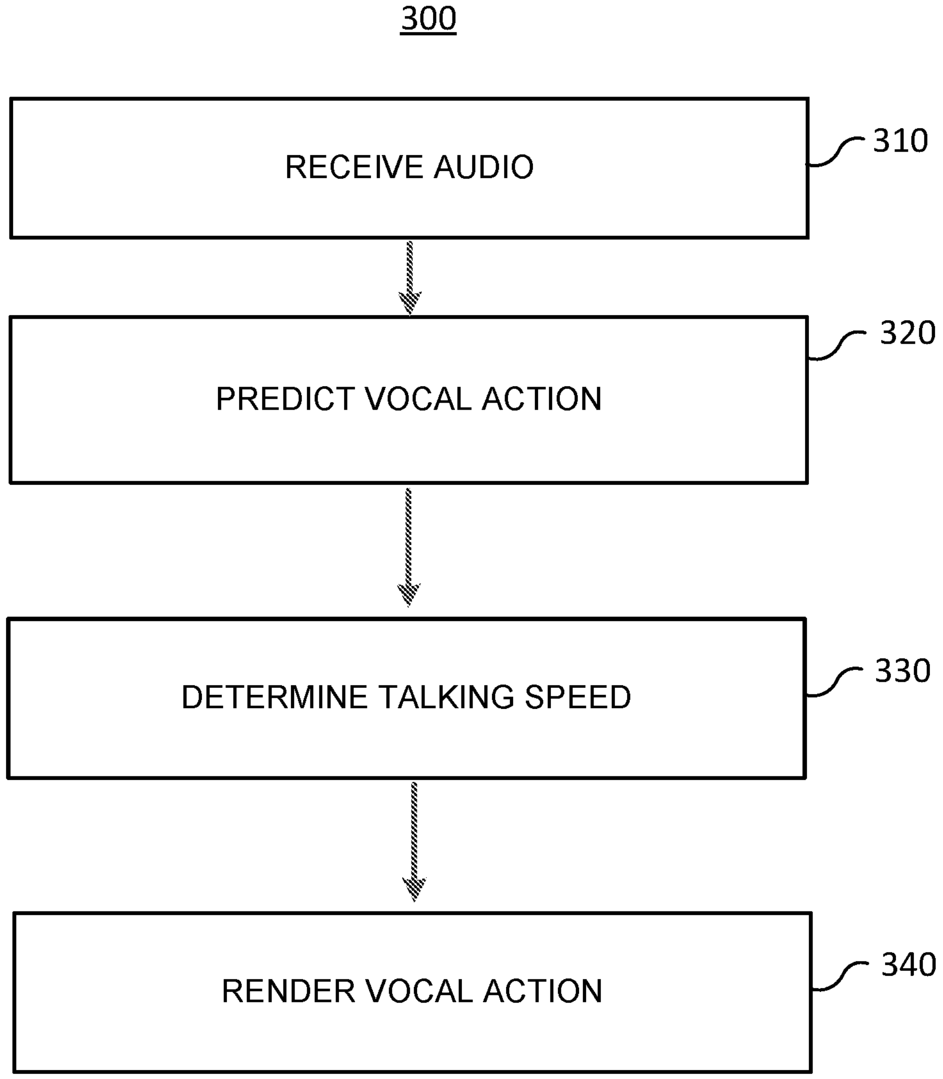
FIG. 3 is a diagram illustrating an exemplary flowchart according to some embodiments.

As shown in flowchart diagram 300 of the example of FIG. 3, the Vocal Action Engine receives audio data associated with a user account. (Act 310) The Vocal Action Engine processes input audio data 402 via implementing acoustic echo cancellation, noise suppression and/or automatic gain control.

The Vocal Action Engine predicts at least one occurrence of a type of a vocal action in the audio data from a plurality of varying types of the same vocal action. (Act 320) The Vocal Action Engine identifies a predefined visual effect that corresponds with each identified type of vocal action. Each predefined visual effect is further associated with a pre-set talking speed.

In one or more embodiments, the Vocal Action Engine detects an occurrence of a type of laughter sound, whereby there may be a plurality of different types of laughter sound. The Vocal Action Engine identifies a laughter visual effect that corresponds with the detected type of laughter sound. The laughter visual effect defines changes applied to a face model such that a digital embodiment, when rendered according to the changed face model, portrays animated facial movements that visually convey performance of the detected type of laughter sound. It is understood that other types of laughter sounds may have different corresponding laughter visual effects.

The Vocal Action Engine determines a talking speed based on the audio data. (Act 330) The Vocal Action Engine applies the talking speed detected in the input audio data to the laughter visual effect's pre-set talking speed. The talking speed detected in the input audio data may be based on a faster rate than the laughter visual effect's pre-set talking speed or a slower rate than the laughter visual effect's pre-set talking speed.

The Vocal Action Engine renders the predicted type of vocal action portrayed according to the talking speed via a face model. (Act 340) The Vocal Action Engine renders the predefined visual effect according to a face model with respect to the modified talking speed. In some embodiments, the Vocal Action Engine classifies a type of vocal action from a variety of different types of the same vocal action. For example, there may be different types of sounds for laughter. Each different sound is best represented via a rendered digital embodiment performing a specific laughter visual effect. That is, each different type of laughter sound may have a corresponding different laughter visual effect.

The Vocal Action Engine continually determines a classifier identifier that is associated with a portion of the audio data. The classifier identifier represents a type of laughter sound. The Vocal Action Engine renders a first laughter visual effect that is related to the classifier identifier. The Vocal Action Engine may subsequently determine another classifier identifier that is associated with a subsequent portion of the audio data. The other classifier identifier thereby has a corresponding different second laughter visual effect.

Each laughter effect is further associated with a specific pre-set amount of time which represents an amount of time during which that laughter effect is to be portrayed by a digital embodiment rendered according to the face model. If the Vocal Action Engine determines the other subsequent classifier identifier for the second laughter visual effect while the rendered digital embodiment visually portrays the first laughter visual effect during the first laughter visual effect's pre-set amount of time, the Vocal Action Engine discards the second laughter visual effect from being eventually rendered because the first laughter visual effect's pre-set amount of time has yet to expire.

In some embodiments, the Vocal Action Engine may implement any type of machine learning technique(s) (or algorithm(s)) to learn the types of laughter visual effects that are likely to be predicted in audio data of a particular user account based on multiple sessions of the user account's use of a digital embodiment and the respective audio data from each session. Based on the learned laughter visual effects, the Vocal Action Engine determines a priority for each learned laughter visual effect. If the Vocal Action Engine determines a subsequent classifier identifier for a higher priority second laughter visual effect while the rendered digital embodiment visually portrays a lower priority first laughter visual effect during the first laughter visual effect's pre-set amount of time, the Vocal Action Engine may preempt the continued rendering the lower priority first laughter visual effect and initiate rendering of the higher priority second laughter visual effect regardless of whether or not the lower priority first laughter visual effect's pre-set amount of time has yet to expire.

Figure 4A:
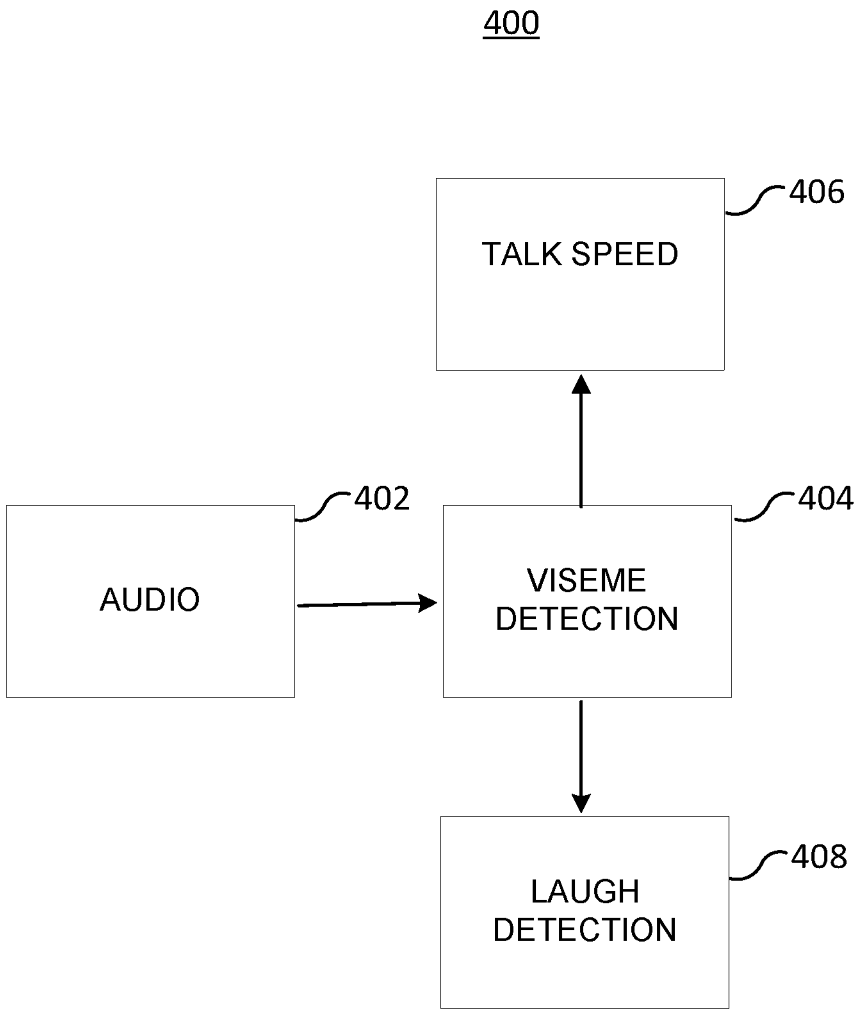

As shown in diagram 400 of the example of FIG. 4A, the Vocal Action Engine feeds processed audio data 402 into a viseme detection model 404. The viseme detection model 404 predicts respective visemes based on features of the processed audio data 402. A viseme is a specific mouth shape that is performed and presented by an individual's face when a particular phoneme sound is being made by that same individual. A phoneme is a perceptually distinct unit of sound. The viseme detection model 404 predicts an appropriate viseme for a current portion of audio data 402 based on various features of respective portions of audio data 402 that precedes the current portion of audio data 402.

A laugh detection model 408 implemented in the Vocal Action Engine receives a feature map from the viseme detection model 404. For example, the feature map may represent respective types of features for phonemes that correspond to different types of laughter sounds. The laugh detection model 408 utilizes the feature map to determine various classes of different laughter sounds represented by the phonemes of the feature map. The laugh detection model 408 outputs a laughter class identifier for a type of laughter sound found in the feature map. A laughter class identifier output by the laugh detection model 408 corresponds to a particular laughter visual effect.

The talk speed model 406 tracks the talking speed in the audio data 402 and controls the speed and strength of the animated movements of a rendered face and/or body in real-time. The talk speed model 406 implemented in the Vocal Action Engine receives a sequence of predicted viseme identifiers from the viseme detection model 404. The talk speed model 406 identifies an amount of time between the receipt of different viseme identifiers present in the sequence. The talk speed model 406 determines that the talking speed of the audio data 402 corresponds to one or more amounts of time between the receipt of the different viseme identifiers. For example, the sequence of viseme identifiers received from viseme detection model 404 may include a series of consecutive instances of the same first viseme identifier for an X amount of time, whereby X may represent any amount of time. A different second viseme identifier may ultimately follow the last instance of the first viseme identifier in the series. The amount of time between different viseme identifiers utilized by the talk speed model 406 determines that the talking speed may be based on an amount of time from the first instance of the first viseme identifier in the series until the different second viseme identifier.

As already described, according to various embodiments, the viseme detection model 404 receives audio input 402 and extracts phoneme information from the audio input 502 and provides a laugh detection model 502 with a feature map of the phoneme information. The Vocal Action Engine may define an audio window length of the audio input 402 as every 1 to 2 seconds. The feature map output of the viseme detection model 404 may have a feature size N for every 10 milliseconds. For example, the feature map size received by the laugh detection model 502 may be N*100 for an audio window defined as 1 second long or N*200 for an audio window defined as 2 seconds long.

As shown in diagram 410 of the example of FIG. 4B, the talk speed model 406 determines the talking speed in the audio data 402 based on a time ranges between frames of differing viseme identifiers in a sequence of viseme identifiers generated by the viseme detection model 404.

Upon receipt of a different viseme identifiers for audio frames i and i−1 in a sequence of viseme identifiers, the talk speed model 406 captures a time stamp of the previous viseme identifier for frame i−1 in the sequence. Di thereby represents the real-time duration of the viseme identifier for frame i. A variable 11. represents a smoothing index. Dsi−1 represents the smoothed duration of the viseme identifier for frame i−1. The talk speed model 406 thereby calculates a smoothed duration (Dsi) of the viseme identifier for frame i.

The talk speed model 406 defines a pre-set time range (Do) for receiving different viseme identifiers. Stated differently, the variable Do represents a relative duration of a single viseme. The talk speed model 406 further defines a pre-set facial and/or body movement speed (So). A variable K is a pre-set constant value. The talk speed model 406 calculates Si, which represents the real-time facial and/or body movement speed and strength at audio frame i. The talk speed model 406 returns Si as output. It is understood that the talk speed model 406 of the Vocal Action Engine implements an algorithm(s) based at least in part on the formula presented in example diagram 410.

Figure 5:
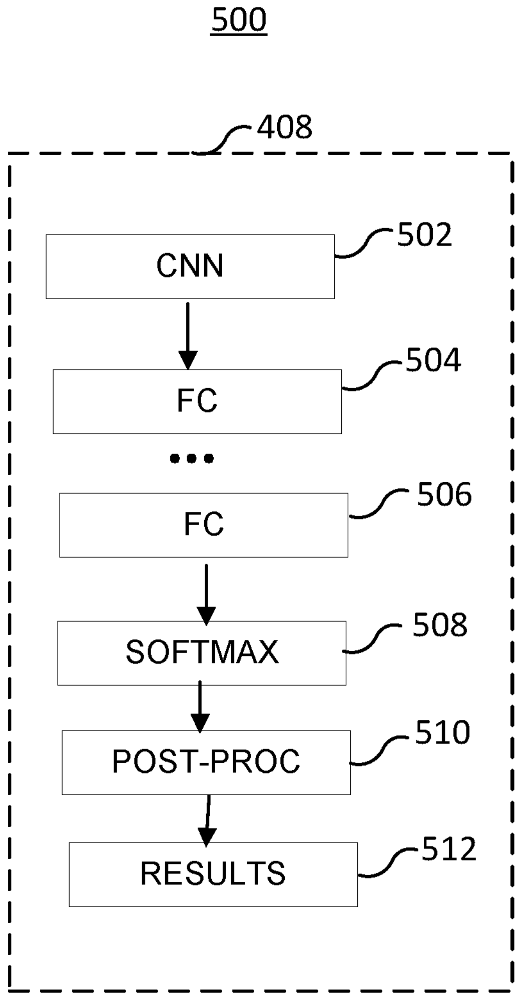
FIG. 5 is a diagram illustrating an exemplary environment in which some embodiments may operate.

As shown in diagram 500 of the example of FIG. 5, the laugh detection model 408 receives a respective feature map for a particular audio window of the audio data 402. The laugh detection model 408 compresses the feature map via one or more convolutional neural network layers 502. One or more fully-connected layers (FC) 504, 506 receives the compressed feature map. The FCs 504, 506 separates and classifies different types of laughter sounds. A softmax layer 508 rescales the classified output of the FCs 504, 506. A post-processing layer 510 implements smoothing techniques on the rescaled output of the softmax layer 508 and the laugh detection model 408 outputs a result 512 comprising an identifier for a predicted occurrence of a type of laughter sound present in the particular audio window of the audio data 402. It is understood that the laugh detection model 408 continually receives additional feature maps that correspond, respectively, to subsequent audio data window instances. As such, the laugh detection model 408 continually returns a laughter sound identifier for a feature map of each audio data window instance.

Figure 6:
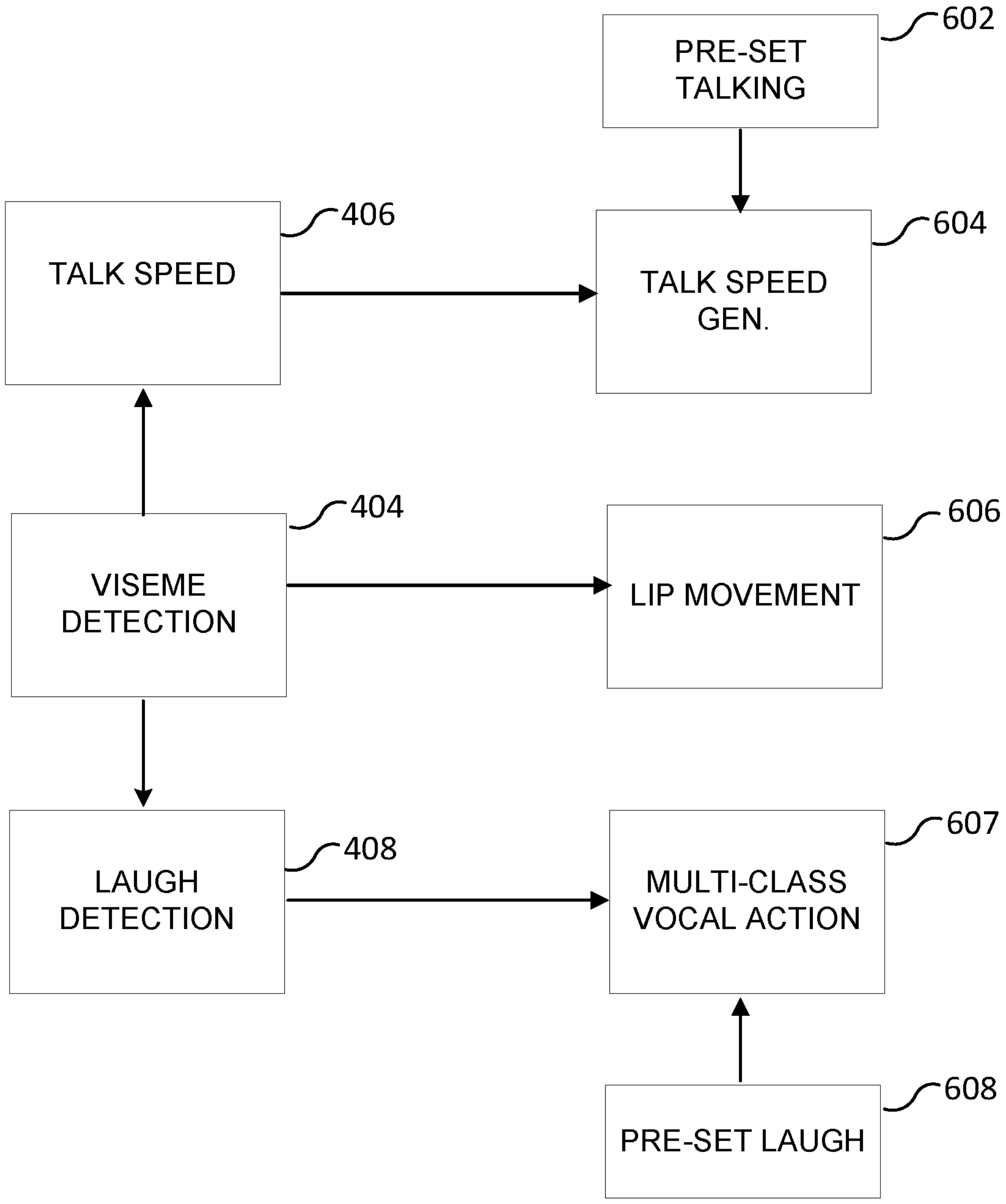
FIG. 6 is a diagram illustrating an exemplary environment in which some embodiments may operate.

As shown in diagram 600 of the example of FIG. 6, the talk speed model 406 sends the talking speed of the audio data 402 to a talking speed driven gesture generation model 604. The talking speed driven gesture generation model 604 retrieves a pre-set talking speed 602 for a gesture visual effect, for example, a laughter visual effect. The talking speed driven gesture generation model 604 modifies the retrieves pre-set talking speed according the to the talking speed (Si).

The laugh detection model 408 sends a vocal action class identifier (such as a laughter class identifier) that corresponds with a particular vocal action visual effect to a multi-class vocal action module 607. Each vocal action visual effect is further associated with pre-set amount of time that designates a duration of time a rendered digital embodiment is to portray that vocal action visual effect. The multi-class vocal action module 607 retrieves the vocal action visual effect that is associated with the received vocal action class identifier. The multi-class vocal action module 607 further retrieves the vocal action visual effect's pre-set amount of time.

The viseme detection model 404 sends the predicted sequence of visemes to lip movement model 606. The lip movement model 606 outputs one or more facial expressions parameters for each predicted viseme. The facial expression parameters correspond to a predefined 3D morphable face model. The facial expression parameters are applied to the face model to generate output of a 3D face mesh for rendering of graphic lip movements of the digital embodiment. The rendered graphic lip movements portray mouth shapes that are performed when an individual physically pronounces a phoneme sound that is mapped to a predicted viseme that corresponds with the applied facial expression parameters. The Vocal Action Engine further modifies the facial expression parameters according to a vocal action visual effect and the determined talking speed.

Figure 7:
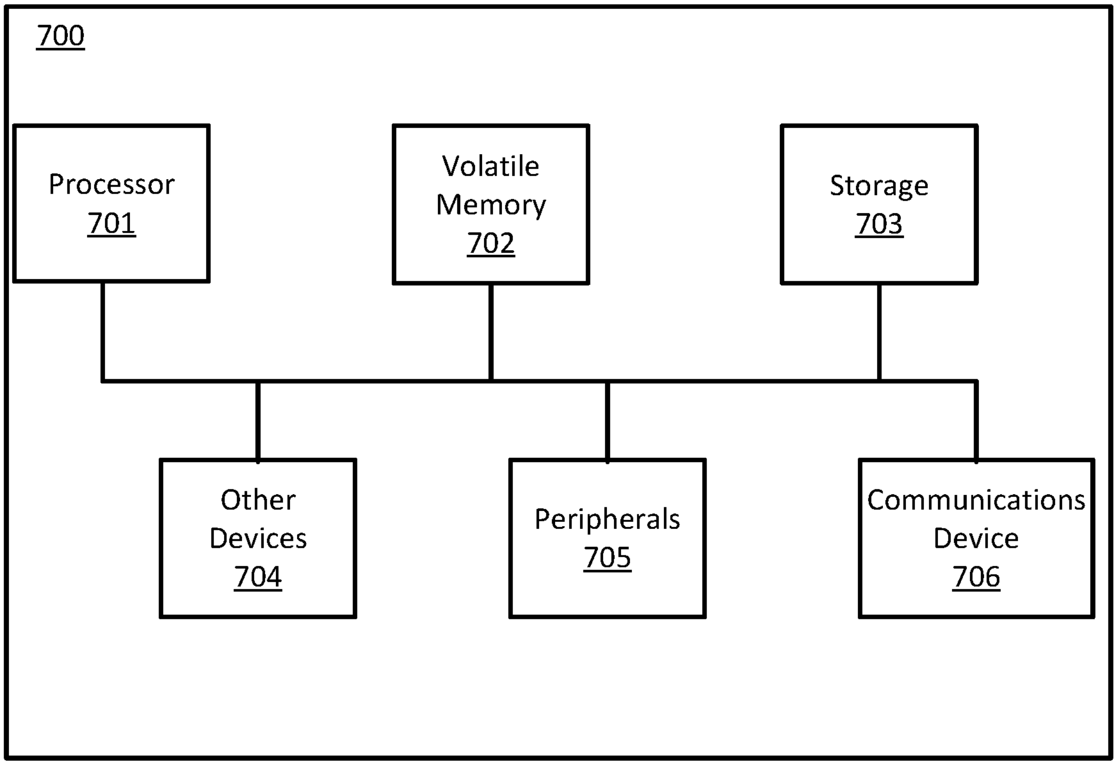
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor?.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: receiving audio data associated with a user account; predicting at least one occurrence of a type of a vocal action in the audio data from a plurality of varying types of the same vocal action; determining a talking speed based on the audio data; and rendering the predicted type of vocal action portrayed according to the talking speed via a face model.

Example 2: The method of Example 1, wherein predicting at least one occurrence of a type of a vocal action comprises: predicting an occurrence of a first type of laughter sound in the audio data; and predicting a subsequent occurrence of a second type of laughter sound in the audio data, the first and the second types of laughter comprising different types of laughter sounds.

Example 3: The method of any Examples 1-2, further comprising: wherein rendering the predicted type of vocal action comprises: determining a first identifier for a predicted occurrence of a first type of a laughter vocal action; modifying a first predefined laughter visual effect for the face model that corresponds to the first identifier according to the determined talking speed; and rendering, according to the face model, the modified first predefined laughter visual effect via a digital embodiment representing the user account.

Example 4: The method of any Examples 1-3, further comprising: wherein modifying a first predefined laughter visual effect comprises: modifying a pre-set speed of the first predefined laughter visual effect according to the determined talking speed, the first predefined laughter visual effect further comprising one or more body visual effects rendered, according to the face model, via the digital embodiment.

Example 5: The method of any Examples 1-4, further comprising: wherein rendering, according to the face model, the modified first predefined laughter visual effect comprises: rendering the modified first predefined laughter visual effect via the digital embodiment for a first pre-set amount of time; determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired.

Example 6: The method of any Examples 1-5, further comprising: upon determining the first pre-set amount of time has yet to expire, discarding the second identifier while the digital embodiment portrays the modified first predefined laughter visual effect.

Example 7: The method of any Examples 1-6, further comprising: upon determining the first pre-set amount of time has expired: modifying a pre-set speed of the second predefined laughter visual effect for the face model that corresponds to the second identifier according to the determined talking speed; and rendering the modified second predefined laughter visual effect via the digital embodiment for a second pre-set amount of time, the second pre-set amount of time preassigned to the second predefined laughter visual effect.

Example 8: A non-transitory computer-readable medium having a computer-readable program code embodied therein to be executed by one or more processors, the program code including instructions for: receiving audio data associated with a user account; predicting at least one occurrence of a type of a vocal action in the audio data from a plurality of varying types of the same vocal action; determining a talking speed based on the audio data; and rendering the predicted type of vocal action portrayed according to the talking speed via a face model.

Example 9: The non-transitory computer-readable medium of Example 8, further comprising: wherein determining a talking speed based on the audio data comprises: receiving a sequence of viseme identifiers, each viseme identifier associated with a respective phoneme in the audio data; determining at least one time range in the sequence between different viseme identifiers; and determining the talking speed based in part on the at least one time range.

Example 10: The non-transitory computer-readable medium of any Examples 8-9, further comprising: wherein rendering the predicted type of vocal action comprises: determining a first identifier for a predicted occurrence of a first type of a laughter vocal action; modifying a first predefined laughter visual effect for the face model that corresponds to the first identifier according to the determined talking speed; and rendering, according to the face model, the modified first predefined laughter visual effect via a digital embodiment representing the user account.

Example 11: The non-transitory computer-readable medium of any Examples 8-10, further comprising: wherein the first predefined laughter visual effect defines an animated performance of an instance of the first type of a laughter vocal action by the face model.

Example 12: The non-transitory computer-readable medium of any Examples 8-11, further comprising: wherein the face model further defines one or more body regions; wherein the first predefined laughter visual effect further defines an animated performance of an instance of the first type of a laughter vocal action at the one or more body regions defined by the face model.

Example 13: The non-transitory computer-readable medium of any Examples 8-12, further comprising: wherein modifying a first predefined laughter visual effect comprises: modifying a pre-set speed of the first predefined laughter visual effect according to the determined talking speed, the first predefined laughter visual effect further comprising one or more body visual effects rendered, according to the face model, via the digital embodiment; and wherein rendering, according to the face model, the modified first predefined laughter visual effect comprises: rendering the modified first predefined laughter visual effect via the digital embodiment for a first pre-set amount of time; determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired.

Example 14: The non-transitory computer-readable medium of any Examples 8-13, further comprising: upon determining the first pre-set amount of time has yet to expire, discarding the second identifier while the digital embodiment portrays the modified first predefined laughter visual effect.

Example 15: The non-transitory computer-readable medium of any Examples 8-14, further comprising: upon determining the first pre-set amount of time has expired: modifying a pre-set speed of the second predefined laughter visual effect for the face model that corresponds to the second identifier according to the determined talking speed; and rendering the modified second predefined laughter visual effect via the digital embodiment for a second pre-set amount of time, the second pre-set amount of time preassigned to the second predefined laughter visual effect.

Example 16: A communication system comprising one or more processors configured to perform the operations of: receiving audio data associated with a user account; predicting at least one occurrence of a type of a vocal action in the audio data from a plurality of varying types of the same vocal action; determining a talking speed based on changes in the audio data that corresponds with the occurrence of the predicted type of vocal action; and rendering the predicted type of vocal action portrayed according to the talking speed via a face model.

Example 17: The communication system of Example 16, further comprising: wherein rendering the predicted type of vocal action comprises: determining a first identifier for a predicted occurrence of a first type of a laughter vocal action; modifying a first predefined laughter visual effect for the face model that corresponds to the first identifier according to the determined talking speed; and rendering, according to the face model, the modified first predefined laughter visual effect via a digital embodiment representing the user account; wherein determining a talking speed based on the audio data comprises: receiving a sequence of viseme identifiers, each viseme identifier associated with a respective phoneme in the audio data; determining at least one time range in the sequence between different viseme identifiers; and determining the talking speed based in part on the at least one time range.

Example 18: The communication system of any Examples 16-17, further comprising: wherein modifying a first predefined laughter visual effect comprises: modifying a pre-set speed of the first predefined laughter visual effect according to the determined talking speed, the first predefined laughter visual effect further comprising one or more body visual effects rendered, according to the face model, via the digital embodiment; and wherein rendering, according to the face model, the modified first predefined laughter visual effect comprises: rendering the modified first predefined laughter visual effect via the digital embodiment for a first pre-set amount of time; determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired.

Example 19: The communication system of any Examples 16-18, further comprising: upon determining the first pre-set amount of time has yet to expire, discarding the second identifier while the digital embodiment portrays the modified first predefined laughter visual effect.

Example 20: The communication system of any Examples 16-19, further comprising: upon determining the first pre-set amount of time has expired: modifying a pre-set speed of the second predefined laughter visual effect for the face model that corresponds to the second identifier according to the determined talking speed; and rendering the modified second predefined laughter visual effect via the digital embodiment for a second pre-set amount of time, the second pre-set amount of time preassigned to the second predefined laughter visual effect.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:

receiving audio data;

predicting at least one occurrence of a type of a vocal action in the audio data from a plurality of varying types of the vocal action;

determining a talking speed based on the audio data;

identifying, via a machine learning model trained on user-specific audio data from a user account, a priority for each predicted type of vocal action, wherein the priority for each predicted type of vocal action is updated in real-time based on ongoing user-specific audio input during a live session;

dynamically modifying, in real-time, a predefined visual effect corresponding to the predicted type of vocal action based on the identified priority and determined talking speed, wherein dynamically modifying the predefined visual effect corresponding to the predicted type of vocal action comprises:

modifying a pre-set speed of the predefined visual effect according to the determined talking speed; and modifying whether to continue rendering the predefined visual effect based on the identified priority for each predicted type of vocal action; and rendering the predicted type of vocal action portrayed according to the talking speed via a face model.

2. The computer-implemented method of claim 1, wherein predicting at least one occurrence of a type of a vocal action comprises:

predicting an occurrence of a first type of laughter sound in the audio data; and predicting a subsequent occurrence of a second type of laughter sound in the audio data, the first and the second types of laughter comprising different types of laughter sounds.

3. The computer-implemented method of claim 1, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing a user account.

4. The computer-implemented method of claim 1, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed, wherein modifying the first predefined laughter visual effect comprises modifying a pre-set speed of the first predefined laughter visual effect according to the determined talking speed, the first predefined laughter visual effect further comprising one or more body visual effects rendered, according to the face model, via a digital embodiment; and rendering, according to the face model, the modified first predefined laughter visual effect via the digital embodiment representing a user account.

5. The computer-implemented method of claim 1, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing a user account, wherein rendering, according to the face model, the modified first predefined laughter visual effect comprises:

rendering the modified first predefined laughter visual effect via the digital embodiment for a first pre-set amount of time;

determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired.

6. The computer-implemented method of claim 1, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing a user account, wherein rendering, according to the face model, the modified first predefined laughter visual effect comprises:

rendering the modified first predefined laughter visual effect via the digital embodiment for a first pre-set amount of time;

determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired; and upon determining the first pre-set amount of time has yet to expire, discarding the second identifier while the digital embodiment portrays the modified first predefined laughter visual effect.

7. The computer-implemented method of claim 1, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing a user account, wherein rendering, according to the face model, the modified first predefined laughter visual effect comprises:

rendering the modified first predefined laughter visual effect via the digital embodiment for a first pre-set amount of time;

determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired; and upon determining the first pre-set amount of time has expired:

modifying a pre-set speed of the second predefined laughter visual effect for the face model that corresponds to the second identifier according to the determined talking speed; and rendering the modified second predefined laughter visual effect via the digital embodiment for a second pre-set amount of time, the second pre-set amount of time preassigned to the second predefined laughter visual effect.

8. A non-transitory computer-readable medium having a computer-readable program code embodied therein to be executed by one or more processors, the program code including instructions for:

receiving audio data associated with a user account;

predicting at least one occurrence of a type of a vocal action in the audio data from a plurality of varying types of a same vocal action;

determining a talking speed based on the audio data;

identifying, via a machine learning model trained on user-specific audio data from a user account, a priority for each predicted type of vocal action, wherein the priority for each predicted type of vocal action is updated in real-time based on ongoing user-specific audio input during a live session;

dynamically modifying, in real-time, a predefined visual effect corresponding to the predicted type of vocal action based on the identified priority and determined talking speed, wherein dynamically modifying the predefined visual effect corresponding to the predicted type of vocal action comprises:

modifying a pre-set speed of the predefined visual effect according to the determined talking speed; and modifying whether to continue rendering the predefined visual effect based on the identified priority for each predicted type of vocal action; and rendering the predicted type of vocal action portrayed according to the talking speed via a face model.

9. The non-transitory computer-readable medium of claim 8, wherein determining a talking speed based on the audio data comprises:

receiving a sequence of viseme identifiers, each viseme identifier associated with a respective phoneme in the audio data;

determining at least one time range in the sequence between different viseme identifiers; and determining the talking speed based in part on the at least one time range.

10. The non-transitory computer-readable medium of claim 8, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing the user account.

11. The non-transitory computer-readable medium of claim 8, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed, wherein the first predefined laughter visual effect defines an animated performance of an instance of the first type of a laughter vocal action by the face model; and rendering, according to the face model, the modified first predefined laughter visual effect via a digital embodiment representing the user account.

12. The non-transitory computer-readable medium of claim 8, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed, wherein the first predefined laughter visual effect defines an animated performance of an instance of the first type of a laughter vocal action by the face model, wherein the face model further defines one or more body regions, and wherein the first predefined laughter visual effect further defines an animated performance of an instance of the first type of a laughter vocal action at the one or more body regions defined by the face model; and rendering, according to the face model, the modified first predefined laughter visual effect via a digital embodiment representing the user account.

13. The non-transitory computer-readable medium of claim 8, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing the user account, wherein modifying a first predefined laughter visual effect comprises:

modifying a pre-set speed of the first predefined laughter visual effect according to the determined talking speed, the first predefined laughter visual effect further comprising one or more body visual effects rendered, according to the face model, via the digital embodiment; and wherein rendering, according to the face model, the modified first predefined laughter visual effect comprises:

rendering the modified first predefined laughter visual effect via the digital embodiment for a first pre-set amount of time;

determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired.

14. The non-transitory computer-readable medium of claim 8, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing the user account, wherein modifying a first predefined laughter visual effect comprises:

modifying a pre-set speed of the first predefined laughter visual effect according to the determined talking speed, the first predefined laughter visual effect further comprising one or more body visual effects rendered, according to the face model, via the digital embodiment; and wherein rendering, according to the face model, the modified first predefined laughter visual effect comprises:

rendering the modified first predefined laughter visual effect via the digital embodiment for a first pre-set amount of time;

determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired; and upon determining the first pre-set amount of time has yet to expire, discarding the second identifier while the digital embodiment portrays the modified first predefined laughter visual effect.

15. The non-transitory computer-readable medium of claim 8, wherein rendering the predicted type of vocal action comprises:

determining a first identifier for a predicted occurrence of a first type of a laughter vocal action;

modifying a first predefined laughter visual effect for the face model that corresponds to the first identifier according to the determined talking speed; and rendering, according to the face model, the modified first predefined laughter visual effect via a digital embodiment representing the user account, wherein modifying a first predefined laughter visual effect comprises:

modifying a pre-set speed of the first predefined laughter visual effect according to the determined talking speed, the first predefined laughter visual effect further comprising one or more body visual effects rendered, according to the face model, via the digital embodiment; and wherein rendering, according to the face model, the modified first predefined laughter visual effect comprises:

rendering the modified first predefined laughter visual effect via the digital embodiment for a first pre-set amount of time;

determining a second identifier for a subsequent predicted occurrence of a second type of a laughter vocal action in the audio data; and determining to render a second predefined laughter visual effect for the face model that corresponds to the second identifier based on determining whether the first pre-set amount of time for rendering the modified first predefined laughter visual effect has expired; and upon determining the first pre-set amount of time has expired:

modifying a pre-set speed of the second predefined laughter visual effect for the face model that corresponds to the second identifier according to the determined talking speed; and rendering the modified second predefined laughter visual effect via the digital embodiment for a second pre-set amount of time, the second pre-set amount of time preassigned to the second predefined laughter visual effect.

16. A communication system comprising:

one or more processors configured to:

receive audio data associated with a user account;

predict at least one occurrence of a type of a vocal action in the audio data from a plurality of varying types of a same vocal action;

determine a talking speed based on changes in the audio data that corresponds with the occurrence of the predicted type of vocal action;

identify, via a machine learning model trained on user-specific audio data from a user account, a priority for each predicted type of vocal action, wherein the priority for each predicted type of vocal action is updated in real-time based on ongoing user-specific audio input during a live session;

dynamically modify, in real-time, a predefined visual effect corresponding to the predicted type of vocal action based on the identified priority and determined talking speed;

modify a pre-set speed of the predefined visual effect according to the determined talking speed; and modify whether to continue rendering the predefined visual effect based on the identified priority for each predicted type of vocal action; and render the predicted type of vocal action portrayed according to the talking speed via a face model.

17. The system of claim 16, wherein the one or more processors are configured to:

determine a first identifier for a predicted occurrence of a first type of a laughter vocal action;

modify a first predefined laughter visual effect for the face model that corresponds to the first identifier according to the determined talking speed; and render, according to the face model, the modified first predefined laughter visual effect via a digital embodiment representing the user account;

receive a sequence of viseme identifiers, each viseme identifier associated with a respective phoneme in the audio data to determine the talking speed;

determine at least one time range in the sequence between different viseme identifiers to determine the talking speed; and determine the talking speed based in part on the at least one time range.

18. The system of claim 16, wherein the one or more processors are configured to:

determine a first identifier for a predicted occurrence of a first type of a laughter vocal action;

modify a first predefined laughter visual effect for the face model that corresponds to the first identifier according to the determined talking speed; and render, according to the face model, the modified first predefined laughter visual effect via a digital embodiment representing the user account;

receive a sequence of viseme identifiers, each viseme identifier associated with a respective phoneme in the audio data to determine the talking speed;

determine at least one time range in the sequence between different viseme identifiers to determine the talking speed;

determine the talking speed based in part on the at least one time range;

modify a pre-set speed of the first predefined laughter visual effect according to the determined talking speed, the first predefined laughter visual effect further comprising one or more body visual effects rendered, according to the face model, via the digital embodiment;

render the modified first predefined laughter visual effect via the digital embodiment for a first pre-set amount of time;

determine a second identifier for a subsequent predicted occurrence of a second type of a laughter vocal action in the audio data; and determine to render a second predefined laughter visual effect for the face model that corresponds to the second identifier based on determining whether the first pre-set amount of time for rendering the modified first predefined laughter visual effect has expired.

19. The system of claim 16, wherein the one or more processors are configured to:

determine a first identifier for a predicted occurrence of a first type of a laughter vocal action;

modify a first predefined laughter visual effect for the face model that corresponds to the first identifier according to the determined talking speed; and render, according to the face model, the modified first predefined laughter visual effect via a digital embodiment representing the user account;

receive a sequence of viseme identifiers, each viseme identifier associated with a respective phoneme in the audio data to determine the talking speed;

determine at least one time range in the sequence between different viseme identifiers to determine the talking speed;

determine the talking speed based in part on the at least one time range;

modify a pre-set speed of the first predefined laughter visual effect according to the determined talking speed, the first predefined laughter visual effect further comprising one or more body visual effects rendered, according to the face model, via the digital embodiment;

render the modified first predefined laughter visual effect via the digital embodiment for a first pre-set amount of time;

determine a second identifier for a subsequent predicted occurrence of a second type of a laughter vocal action in the audio data;

determine to render a second predefined laughter visual effect for the face model that corresponds to the second identifier based on determining whether the first pre-set amount of time for rendering the modified first predefined laughter visual effect has expired; and discard the second identifier while the digital embodiment portrays the modified first predefined laughter visual effect based on a determination that the first pre-set amount of time has yet to expire.

20. The system of claim 16, wherein the one or more processors are configured to:

determine a first identifier for a predicted occurrence of a first type of a laughter vocal action;

modify a first predefined laughter visual effect for the face model that corresponds to the first identifier according to the determined talking speed; and render, according to the face model, the modified first predefined laughter visual effect via a digital embodiment representing the user account;

receive a sequence of viseme identifiers, each viseme identifier associated with a respective phoneme in the audio data to determine the talking speed;

determine at least one time range in the sequence between different viseme identifiers to determine the talking speed;

determine the talking speed based in part on the at least one time range;

modify a pre-set speed of the first predefined laughter visual effect according to the determined talking speed, the first predefined laughter visual effect further comprising one or more body visual effects rendered, according to the face model, via the digital embodiment;

render the modified first predefined laughter visual effect via the digital embodiment for a first pre-set amount of time;

determine a second identifier for a subsequent predicted occurrence of a second type of a laughter vocal action in the audio data;

determine to render a second predefined laughter visual effect for the face model that corresponds to the second identifier based on determining whether the first pre-set amount of time for rendering the modified first predefined laughter visual effect has expired;

modify a pre-set speed of the second predefined laughter visual effect for the face model that corresponds to the second identifier according to the determined talking speed based on a determination that the first pre-set amount of time has expired; and render the modified second predefined laughter visual effect via the digital embodiment for a second pre-set amount of time based on a determination that the first pre-set amount of time has expired, the second pre-set amount of time preassigned to the second predefined laughter visual effect.

* * * * *